(No Model.)
R. KILMER.
NUT LOCK.
No. 470,493. Patented Mar. 8, 1892.
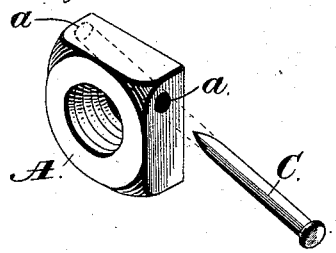
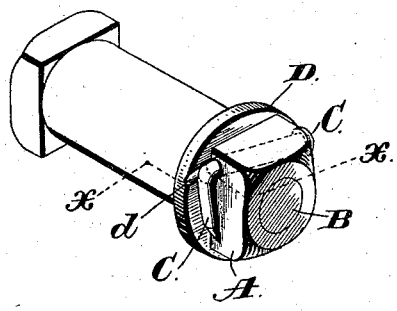
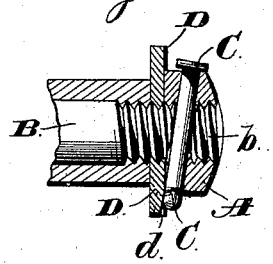
Witnesses:
Jas. E. Hutchinson
Henry C. Hazard
Inventor
Ransom Kilmer, by
Prindle and Russell, his Attys

UNITED STATES PATENT OFFICE.

RANSOM KILMER, OF NEWBURG, NEW YORK.

NUT-LOCK.

SPECIFICATION forming part of Letters Patent No. 470,493, dated March 8, 1892.

Application filed August 31, 1891. Serial No. 404,290. (No model.)

*To all whom it may concern:*

Be it known that I, RANSOM KILMER, of Newburg, in the county of Orange, and in the State of New York, have invented certain new and useful Improvements in Nut-Locks; and I do hereby declare that the following is a full, clear, and exact description thereof, reference being had to the accompanying drawings, in which—

Figure 1 is a perspective view of a nut and a locking-key therefor constructed in accordance with my invention; Fig. 2, a similar view of the same in place upon a bolt, and Fig. 3 is a sectional view on the line $x$ $x$ of Fig. 2.

Letters of like name and kind refer to like parts throughout the several figures.

The design of my invention is to construct a nut-lock which shall be simple in construction and effective in operation for use on railroads and other places where it is desirable and important that nuts should be retained in position on their bolts; and to this end said invention consists in a nut-lock constructed as hereinafter described and claimed.

My invention belongs more particularly to that class of nut-locks in which a key is driven through a hole provided in the nut tangential to the bolt, so as to impinge on the thread thereof.

In carrying my invention into practice I provide a nut A with an opening $a$, that extends obliquely through the same, commencing at one side near the top or outer face of the nut and passing to the opposite side, so as to extend partially through said side and the base or inner side of the nut. A key C, longer than the opening and driven through the same, will thus emerge at the base or inner side of the nut and impinge against and form a seat in the face of the adjacent part. Such part, as shown in the drawings, is a washer D, with a slight groove or seat $d$ formed by the key C. The portion of the key that extends beyond the nut is turned down against the side of the same, but of course with a portion still in engagement with said groove $d$.

The obliquity of the opening $a$ in the nut A insures that the pin C will absolutely produce the marring or offsetting of the thread necessary for locking the nut by this means and avoids the liability of the key simply passing through the grooves between the thread without a marring effect. The most advantageous direction to be given the key is that which approximates a line most nearly in the direction which is at a right angle to the one in which the thread runs. This, with right-hand thread, is obtained by passing the key through the nut from the right-hand side, near its top or outer face, to the diagonally-opposite corner, and with left-hand thread by a reverse arrangement.

Having thus described my invention, what I claim is—

1. In combination with a threaded bolt and its nut and the parts secured thereby, a key passed through an opening in the nut that extends from one side to the other and at an angle that causes it to terminate at the base or inner side of the nut, whereby said key may impinge against the part adjoining said nut and form a groove or seat therein, substantially as and for the purpose specified.

2. In combination with a threaded bolt, a washer and a nut thereon, a key driven through an opening in said nut tangential to said bolt and in a direction oblique to the direction of the thread, so as to intersect and offset the same, said opening extending from one side of said nut diagonally across to the other and into the rear face thereof, so that said key impinges upon and forms a groove or seat in the face of said washer, substantially as and for the purpose shown.

In testimony that I claim the foregoing I have hereunto set my hand this 17th day of February, 1891.

RANSOM KILMER.

Witnesses:
WILLIAM D. DICKEY,
HARRY R. LYDECKER.